R. A. HILLSTROM.
LOAD EQUALIZER FOR VEHICLES.
APPLICATION FILED AUG. 16, 1920.
1,403,687.
Patented Jan. 17, 1922.
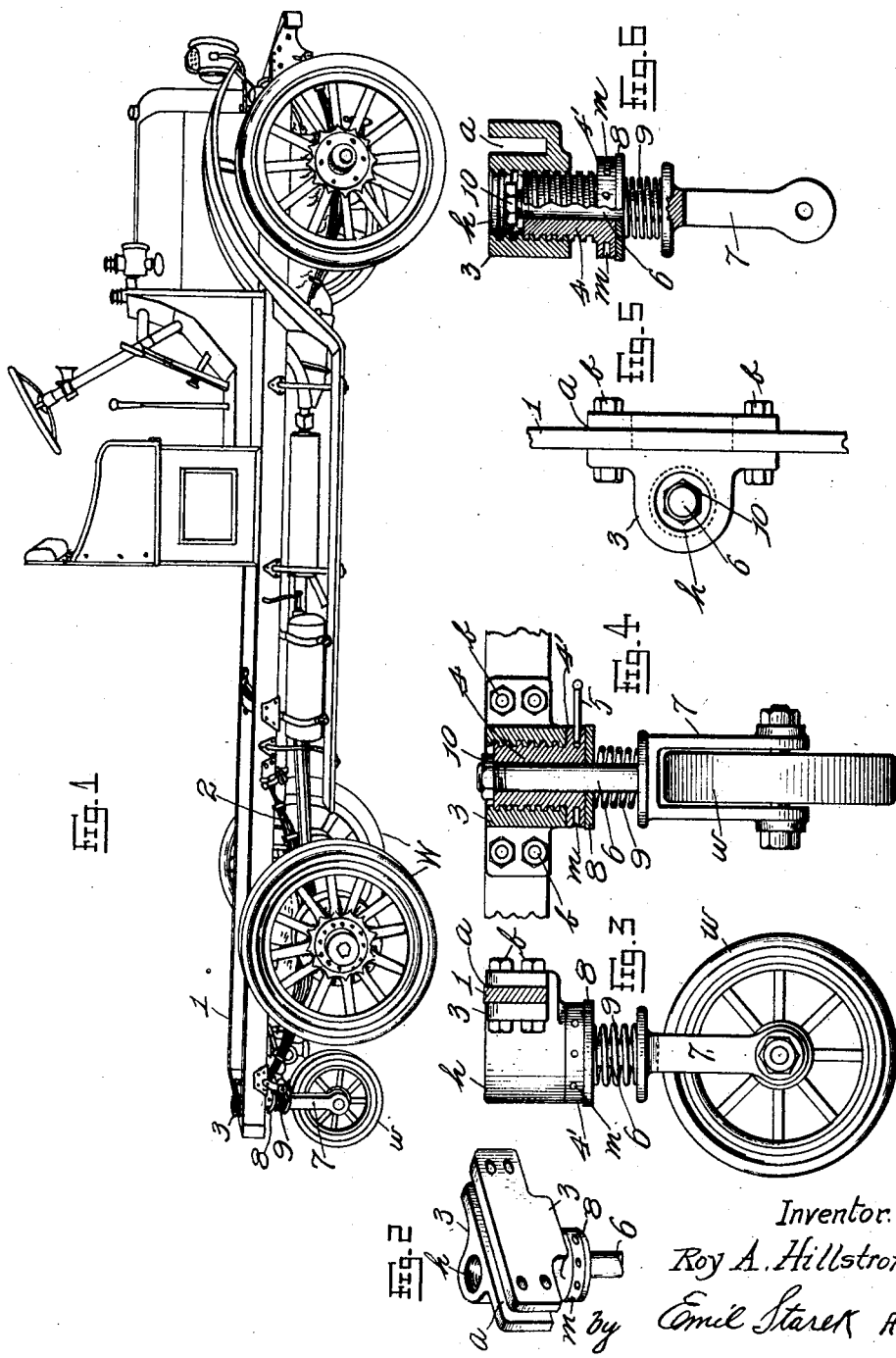
Inventor.
Roy A. Hillstrom
by Emil Starek Atty.

UNITED STATES PATENT OFFICE.

ROY A. HILLSTROM, OF ST. LOUIS, MISSOURI.

LOAD EQUALIZER FOR VEHICLES.

1,403,687. Specification of Letters Patent. Patented Jan. 17, 1922.

Application filed August 16, 1920. Serial No. 403,997.

*To all whom it may concern:*

Be it known that I, ROY A. HILLSTROM, a citizen of the United States, residing at St. Louis, State of Missouri, have invented certain new and useful Improvements in Load Equalizers for Vehicles, of which the following is a full, clear, and exact description, reference being had to the accompanying drawings, forming a part hereof.

The present invention is directed to improvements in load equalizers for vehicles, and motor trucks in particular, the primary object being to provide a motor-truck designed to carry a given load, with means for taking care of any excess weight that may be loaded on the truck under special conditions or in case of necessity, said means being in the form of a supplemental running wheel secured to the rear end of the frame of the truck at a point midway between the rear truck wheels. This supplemental wheel operates as a traveling jack, a suitable spring being however interposed between the wheel and the frame of the truck, said spring taking up a portion of the load imposed on the regular springs on which the rear end of the truck frame is supported. The advantages of the improvement will be clearly apparent from the following detailed description in connection with the accompanying drawings in which—

Figure 1 represents a perspective of a motor truck showing my invention applied thereto; Fig. 2 is a perspective of the casting which supports the adjustable bearing to which the supplemental wheel is swiveled; Fig. 3 is a side elevation of the parts constituting the improvement when assembled; Fig. 4 is an end view thereof, with parts in section; Fig. 5 is a top plan of the supporting casting showing the manner of attaching the same to the rear cross member of the truck frame; and Fig. 6 is a vertical middle sectional view of the supporting casting with the adjustable bearing mounted therein, the latter being adjusted to impose a part of the load on the fork carrying the supplemental wheel.

Referring to the drawings, 1 represents the chassis frame supported in the rear by the springs 2 as well understood in the art. Secured to the rear cross member of the frame 1 at a middle point thereof is a casting 3, the same being formed with a channel $a$ for receiving said cross member (Fig. 3), the parts being subsequently secured together by bolts $b$ passed through the walls of the channel and through the cross member as clearly shown in the drawings. Any other suitable supporting member secured to the frame 1 would fall within the scope of my invention. Formed with the casting 3 is a screw socket $h$ which receives an adjustable tubular screw-bearing 4, the lower end of the bearing terminating in an enlarged head 4′ which engages the bottom end of the socket $h$ when the parts are in normal position and out of service. The head 4′ is formed with a series of peripheral sockets $m$ for the reception of one end of a bar or lever 5 by means of which rotation may be imparted to the screw 4. Traversing the bore of the tubular bearing 4 is the stem or spindle 6 of a fork 7 between the arms of which is mounted a supplemental running wheel $w$, said wheel, and the usual rear truck wheels W jointly sustaining the load deposited on the truck when the wheel $w$ is adjusted to service position. Passed loosely over the lower projecting portion of the stem 6 and engaging the bottom face of the head 4′ is a disk 8 between which and the base of the fork 7 is interposed a coiled compression spring 9, the stem 6 passing loosely through the coils of the spring and being freely rotatable in the bore of the tubular bearing or screw 4. The upper end of the stem 6 is provided with a nut 10 to prevent the stem from dropping out of the bearing 4 once the same has been inserted thereinto as clearly obvious from the drawings.

The spring 9 is expanded when the bearing 4 is fully screwed into the socket $h$ (Figs. 3, 4); and while the tread of the wheel $w$ engages the ground, yet, it does not materially support any portion of the load when the weight of such load is not in excess of that for which the truck is designed. When any excess load is deposited on the truck however, the driver by unscrewing or lowering the screw bearing 4 (Fig. 6) imposes increased tension on the spring 9 thereby compressing it, this compression in turn relieving the springs 2 of a portion of the load deposited on the truck. It is obvious that the further the bearing 4 is unscrewed or depressed the greater will be the compression of the spring 9, and the less the tension imposed on the truck-springs 2. By proper adjustment of the bearing 4 the load carried by the truck may be distributed equally among the several springs 2, 2, 9, making it possible to load the truck with an excess weight without unduly straining the springs 2 or imposing too much of a load on the wheels W. It will be obvious from Fig. 6 that an unscrewing of the bearing 4 operates to lift the casting 3 and hence tends to lift the truck frame and the load deposited thereon, said load in turn imposing increased tension on the spring 9, which thus assists the springs 2 in supporting the load.

In the present embodiment of my invention the vertical adjustment of the bearing 4 is accomplished by means of a screw and socket arrangement; but it is apparent that any other manner of adjusting the member by which the stem 6 of the wheel fork is supported falls within the spirit of my invention. Obviously, the details of construction might be changed materially without involving a departure from the invention. In the form here shown and where a screw bearing such as 4 is employed, the surfaces between the disk 8 and the bottom of the casting 3 should be well lubricated so as to reduce the friction when the screw is turned for purposes of adjustment. The spindle 6 being freely rotatable in the bore of the screw bearing 4 permits the vehicle to turn without material resistance on the part of the wheel w.

Having described my invention what I claim is:

1. In combination with a motor-truck frame, a vertically adjustable bearing carried at the rear end of the frame, a vertical rotary spindle mounted in said bearing and projecting below the same, a fork depending from the lower projecting end of the spindle, a compression spring coiled about the lower portion of the spindle and interposed between the base of the fork and the bottom of the bearing, and a running wheel mounted in the fork.

2. A traveling jack for vehicles, comprising a tubular screw-bearing, a socket member for receiving the same, said member being securable to the vehicle, a fork provided with a spindle loosely traversing the bore of the screw bearing, a compression spring coiled about the lower portion of the spindle and interposed between the base of the fork and the bottom of the bearing, a running wheel mounted between the fork members, and means for rotating the screw bearing from a point outside the socket member supporting the same.

In testimony whereof I affix my signature, in presence of two witnesses.

ROY A. HILLSTROM.

Witnesses:
EMIL STAREK,
JOS. A. MICHEL.